United States Patent
Kawamura

(10) Patent No.: US 12,091,993 B2
(45) Date of Patent: Sep. 17, 2024

(54) HYDRAULIC OIL CONTROL VALVE AND VALVE TIMING ADJUSTING DEVICE

(71) Applicant: DENSO CORPORATION, Kariya (JP)

(72) Inventor: Futoshi Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 17/966,406

(22) Filed: Oct. 14, 2022

(65) Prior Publication Data

US 2023/0041351 A1 Feb. 9, 2023

Related U.S. Application Data

(63) Continuation of application No. PCT/JP2021/014207, filed on Apr. 1, 2021.

(30) Foreign Application Priority Data

Apr. 17, 2020 (JP) .................................. 2020-073830

(51) Int. Cl.
 *F16K 11/07* (2006.01)
 *F01L 1/344* (2006.01)

(52) U.S. Cl.
 CPC ........ *F01L 1/3442* (2013.01); *F16K 11/0716* (2013.01); *F01L 2001/3443* (2013.01)

(58) Field of Classification Search
 CPC ............... F16K 11/0716; F01L 1/3442; F01L 2001/3443; F01L 1/047; F01L 1/34479; F01L 1/34456; F01L 2303/00; F01L 2001/34469; F01L 2301/00
 See application file for complete search history.

(56) References Cited

U.S. PATENT DOCUMENTS

| | | |
|---|---|---|
| 2015/0144211 A1 | 5/2015 | Kinscher et al. |
| 2015/0300212 A1 | 10/2015 | Bayrakdar |
| 2016/0061063 A1 | 3/2016 | Hayashi |
| 2018/0135473 A1 | 5/2018 | Asahi et al. |
| 2019/0107014 A1* | 4/2019 | Smith .................... F01L 1/3442 |
| 2019/0323392 A1* | 10/2019 | Mitsutani ............ F02D 13/0219 |
| 2020/0141289 A1* | 5/2020 | Asahi .................... F16K 11/078 |

FOREIGN PATENT DOCUMENTS

| | | |
|---|---|---|
| CN | 105909333 | 8/2016 |
| DE | 10 2015 206 354 | 10/2016 |
| DE | 10 2016 214 403 | 6/2017 |
| DE | 10 2017 105 074 | 9/2018 |

* cited by examiner

*Primary Examiner* — Kelsey E Cary
(74) *Attorney, Agent, or Firm* — Nixon & Vanderhye P.C.

(57) ABSTRACT

A hydraulic oil control valve includes an outer sleeve, an inner sleeve and a spool. The outer sleeve includes: a threaded portion, which is fixed to a camshaft; a projection, which is fixed to a phase changer; and ports, which are formed at a peripheral surface of the outer sleeve between the threaded portion and the projection. The inner sleeve includes: ports, which are communicated with the ports of the outer sleeve; an oil port; an axial groove; and an enlarged diameter portion, which is located on one side of the projection where an insertion opening of the outer sleeve is placed. The spool includes: land portions, which are configured to slide along an inner peripheral surface of the inner sleeve and are located at an outer periphery of the spool at a location that is on another side of the projection where the threaded portion is placed.

13 Claims, 10 Drawing Sheets

HYDRAULIC OIL CONTROL VALVE AND VALVE TIMING ADJUSTING DEVICE

CROSS REFERENCE TO RELATED APPLICATIONS

This application is a continuation application of International Patent Application No. PCT/JP2021/014207 filed on Apr. 1, 2021, which designated the U.S. and claims the benefit of priority from Japanese Patent Application No. 2020-073830 filed on Apr. 17, 2020. The entire disclosures of all of the above applications are incorporated herein by reference.

TECHNICAL FIELD

The present disclosure relates to a hydraulic oil control valve and a valve timing adjusting device.

BACKGROUND

Previously, there has been known a hydraulic valve timing adjusting device that is configured to adjust a valve timing of intake valves or exhaust valves of an internal combustion engine. The valve timing adjusting device includes a sleeve of a double structure which includes an outer sleeve and an inner sleeve. The outer sleeve has two types of ports, each of which forms an oil passage that supplies the oil to a variable valve timing mechanism. The inner sleeve also has two types of ports, which supply the oil to the two types of ports of the outer sleeve. The oil is discharged from a side, at which a solenoid for driving a spool at an inside of the inner sleeve, is placed.

SUMMARY

This section provides a general summary of the disclosure, and is not a comprehensive disclosure of its full scope or all of its features.

According to the present disclosure, there is provided a hydraulic oil control valve configured to control a hydraulic oil pressure of hydraulic oil to be supplied to a valve timing adjusting device that is placed between a crankshaft and a camshaft of an internal combustion engine and is configured to adjust an opening timing and a closing timing of a valve by changing a phase of a phase changer placed between the crankshaft and the camshaft. The hydraulic oil control valve includes: an outer sleeve, which is shaped in a cylindrical tubular form; an inner sleeve, which is shaped in a cylindrical tubular form and is located on an inner side of the outer sleeve; and a spool, which is shaped in a cylindrical tubular form and is placed on an inner side of the inner sleeve, wherein the spool is configured to be slid along the inner sleeve when the spool is driven by an actuator that is placed at an end portion of the hydraulic oil control valve, which is opposite to the camshaft.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
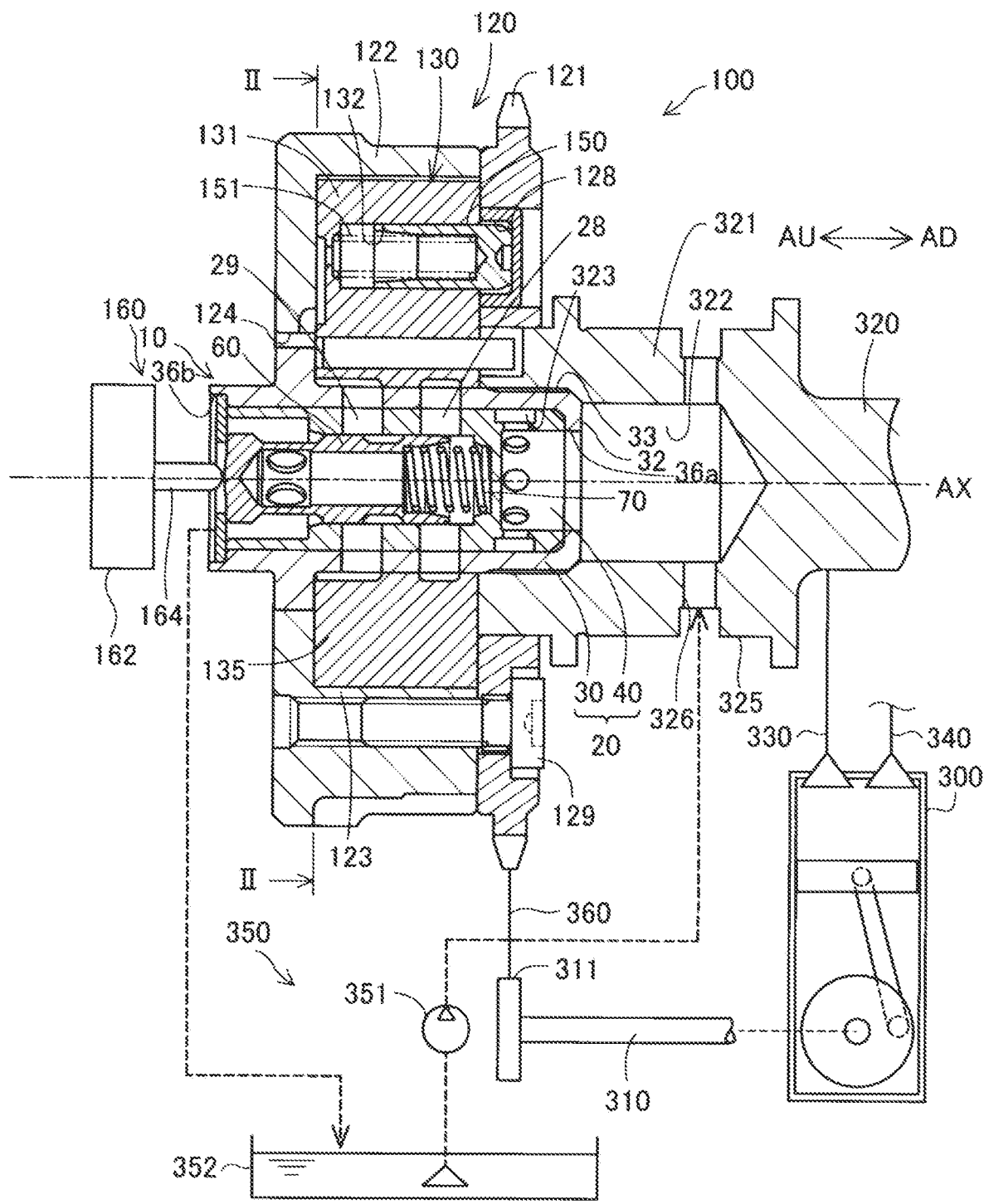
FIG. 1 is a cross-sectional view showing a schematic structure of a valve timing adjusting device including a hydraulic oil control valve.

Previously, there has been known a hydraulic valve timing adjusting device that is configured to adjust a valve timing of intake valves or exhaust valves of an internal combustion engine. The valve timing adjusting device includes a sleeve of a double structure which includes an outer sleeve and an inner sleeve while an oil passage, which conducts oil in an axial direction, is formed between the outer sleeve and the inner sleeve. The outer sleeve has two types of ports, each of which forms an oil passage that supplies the oil to a variable valve timing mechanism. The inner sleeve also has two types of ports, which supply the oil to the two types of ports of the outer sleeve. The oil is discharged from a side, at which a solenoid for driving a spool at an inside of the inner sleeve, is placed.

In the above structure, a land portion of the spool, which is located on the solenoid side, is placed on the solenoid side of a flange (projection) of the outer sleeve, and a sliding portion between the inner sleeve and the spool extends to a location which is on the solenoid side of the flange. Therefore, when the outer sleeve is deformed at the time of assembly, this will possibly have an influence on the sliding portion.

The present disclosure can be implemented as follows.

According to one aspect of the present disclosure, there is provided a hydraulic oil control valve configured to control a hydraulic oil pressure of hydraulic oil to be supplied to a valve timing adjusting device that is placed between a crankshaft and a camshaft of an internal combustion engine and is configured to adjust an opening timing and a closing timing of a valve by changing a phase of a phase changer placed between the crankshaft and the camshaft. The hydraulic oil control valve includes: an outer sleeve, which is shaped in a cylindrical tubular form; an inner sleeve, which is shaped in a cylindrical tubular form and is located on an inner side of the outer sleeve; and a spool, which is shaped in a cylindrical tubular form and is placed on an inner side of the inner sleeve, wherein the spool is configured to be slid along the inner sleeve when the spool is driven by an actuator that is placed at an end portion of the hydraulic oil control valve, which is opposite to the camshaft.

The outer sleeve has:
an opening, which is formed at one end portion of the outer sleeve located on a side where the camshaft is placed, and an insertion opening, which is formed at another end portion of the outer sleeve that is opposite to the opening, wherein the inner sleeve is inserted into the outer sleeve through the insertion opening;
a threaded portion, which is used to fix the outer sleeve relative to the camshaft;
a projection, which radially outwardly projects and is fixed relative to the phase changer; and
two types of outer sleeve ports, which are formed at a peripheral surface of the outer sleeve at two locations, respectively, arranged one after another between the threaded portion and the projection in an axial direction of a rotational axis, wherein the two types of outer sleeve ports are configured to communicate between an inside and an outside of the outer sleeve.

The inner sleeve has:
two types of inner sleeve ports, which are configured to communicate between an inside and an outside of the inner sleeve and are communicated with the two types of outer sleeve ports, respectively;
an oil port, which is located between the two types of inner sleeve ports in the axial direction of the rotational axis and is configured to communicate between the inside and the outside of the inner sleeve; and
an enlarged diameter portion, which is located on one side of the projection where the insertion opening is placed, wherein the enlarged diameter portion has an inner diameter that is increased relative to an inner diameter of an adjacent part of the inner sleeve which is adjacent to the enlarged diameter portion.

The spool has:
two land portions, which are located at an outer periphery of the spool at a location that is on another side of the projection where the threaded portion is placed, wherein the two land portions radially outward project and circumferentially extend, and the two land portions are configured to slide along an inner peripheral surface of the inner sleeve, and each of the two land portions is configured to close a corresponding one of the two types of inner sleeve ports depending on a position of the spool;
a spool groove, which is formed between the two land portions and is radially recessed relative to the two land portions, wherein the spool groove is communicated with the oil port, and the spool groove is configured to communicate with one of the two types of inner sleeve ports depending on the position of the spool; and
a spool port, which is configured to communicate with another one of the two types of inner sleeve ports and is configured to communicate between an inside and an outside of the spool, wherein the spool port is configured to communicate with the insertion opening through the enlarged diameter portion.

At least one of the outer sleeve and the inner sleeve has an axial groove which is configured to conduct the hydraulic oil in the axial direction of the rotational axis while the axial groove is configured to communicate between the oil port and the opening.

According to the above-described aspect, the sliding portion (the sliding surface), at which the land portions of the spool are slid relative to the inner surface of the inner sleeve, can be placed between the projection and the opening. Thus, the distance between the two types of ports can be reduced. Thereby, even when the axial force is applied to the outer sleeve, the amount of deformation of the outer sleeve around the sliding portion can be reduced. Furthermore, since the enlarged diameter portion is provided, the pressure loss of the hydraulic oil, which flows in the enlarged diameter portion, can be reduced.

Hereinafter, embodiments of the present disclosure will be described with reference to the drawings.

A. First Embodiment

A-1. Device Structure:

A valve timing adjusting device 100 is installed to an internal combustion engine 300 of a vehicle (not shown). The internal combustion engine 300 includes a crankshaft 310, a camshaft 320, intake valves (serving as valves) 330 and exhaust valves (serving as valves) 340. The valves 330, 340 are opened and closed synchronously with the crankshaft 310. As shown in FIG. 1, the valve timing adjusting device 100 is installed in a drive force transmission path extending from the crankshaft 310 to the camshaft 320 and adjusts an opening timing and a closing timing of the valves 330, 340 by changing a phase of the camshaft 320 relative to the crankshaft 310. In the present embodiment, the valve timing adjusting device 100 is fixed to an end portion 321 of the camshaft 320 in an axial direction of a rotational axis AX of the camshaft 320. The rotational axis AX of the valve timing adjusting device 100 coincides with the rotational axis AX of the camshaft 320. The valve timing adjusting device 100 of the present embodiment adjusts the opening timing and the closing timing of the intake valves 330 among the intake valves 330 and the exhaust valves 340, which serve as the valves.

The valve timing adjusting device 100 includes: a housing 120; a vane rotor 130 installed at an inside of the housing 120; and a hydraulic oil control valve 10. The hydraulic oil control valve 10 includes a sleeve 20, a spool 60 and a spring 70. The sleeve 20 includes an outer sleeve 30 and an inner sleeve 40, and the inner sleeve 40 is placed at an inside of the outer sleeve 30. The spool 60 and the spring 70 are placed at an inside of the inner sleeve 40.

The spring 70 adds a preload against the spool 60 in a direction AU. Here, the direction AU is a direction away from the camshaft 320 along the rotational axis AX, and a direction AD is a direction toward the camshaft 320 along the rotational axis AX. A solenoid 160 is placed on a side (hereinafter also referred to as an AU side) of the spool 60 in the direction AU. The solenoid 160 is a device that drives the spool 60 of the hydraulic oil control valve 10 forward or backward along the rotational axis AX at the inside of the inner sleeve 40. The solenoid 160 includes an electromagnetic device 162 and a shaft 164. When the electromagnetic device 162 of the solenoid 160 is energized in response to a command outputted from an electronic control device (ECU) which controls an overall operation of the internal combustion engine 300, the electromagnetic device 162 drives the shaft 164 in the direction AD against the preload of the spring 70 to urge the spool 60. The spool 60 is moved forward or backward along the rotational axis AX at the inside of the inner sleeve 40 in response to a balance between the preload of the spring 70 and the urging force of the solenoid 160.

Each of the outer sleeve 30 and the inner sleeve 40 has a plurality of through-holes that communicate between the inside and the outside thereof. Each of the through-holes of the outer sleeve 30 is communicated with a corresponding one of the through-holes of the inner sleeve 40 to form a plurality of retard ports 28 and a plurality of advance ports 29. The hydraulic oil control valve 10 supplies the hydraulic oil to a gap between the housing 120 and the vane rotor 130 through at least one of the ports 28, 29 according to a position of the spool 60 in the inside of the inner sleeve 40 and thereby changes a phase between the housing 120 and the vane rotor 130 to adjust the valve timing.

A shaft hole 322 is formed at a center of the end portion 321 of the camshaft 320, and a supply hole 326 is formed at an outer peripheral surface of the end portion 321 of the camshaft 320. The shaft hole 322 is coaxial with the rotational axis (central axis) AX. A female-threaded portion 323 for fixing the hydraulic oil control valve 10 is formed at an inner peripheral surface of the shaft hole 322. The female-threaded portion 323 is threadably engaged with a male-threaded portion (serving as a threaded portion) 33 that is formed at the outer sleeve 30 of the hydraulic oil control valve 10. The supply hole 326 extends in a radial direction of the camshaft 320 and communicates between an outer peripheral surface 325 of the camshaft 320 and the shaft hole 322. An oil reservoir (not shown) is formed at the outer peripheral surface 325. The hydraulic oil, which is supplied from a hydraulic oil supply source 350, is supplied from the oil reservoir to the hydraulic oil control valve 10 through the supply hole 326 and the shaft hole 322. The hydraulic oil supply source 350 includes an oil pump 351 and an oil pan 352. The oil pump 351 suctions the hydraulic oil stored in the oil pan 352.

The housing 120 includes a sprocket 121 and a case 122. The sprocket 121 is rotatably fitted to the end portion 321 of the camshaft 320. A timing chain 360, which is shaped in a ring form, is wound between the sprocket 121 and a sprocket 311 of the crankshaft 310 of the internal combustion engine 300. The sprocket 121 is fixed to the case 122 by a plurality of bolts 129. Therefore, the housing 120 is rotated synchronously with the crankshaft 310. The case 122 is shaped in a bottomed tubular form, and an opening end of the case 122 is closed by the sprocket 121. An opening 124 is formed at a center of a bottom portion of the case 122 which is opposite from the sprocket 121.

Figure 2:
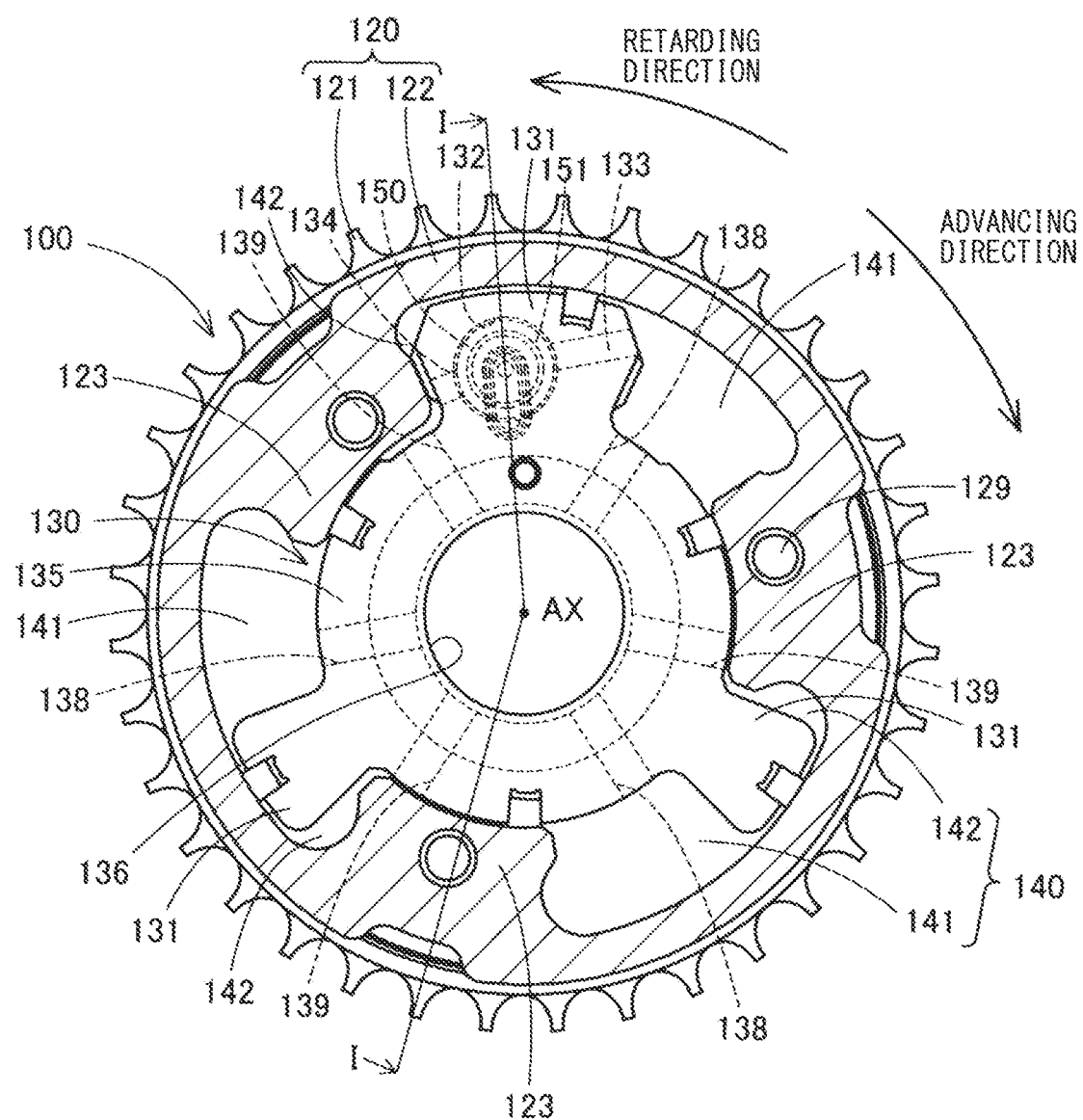
FIG. 2 is a cross-sectional view showing a cross section taken along line II-II in FIG. 1.

As shown in FIG. 2, the case 122 has a plurality of partition wall portions 123 which project radially inward and are arranged one after another in a circumferential direction. In FIG. 2, indication of the hydraulic oil control valve 10 is omitted for the sake of simplicity. A space, which is formed between each circumferentially adjacent two of the partition wall portions 123, functions as a hydraulic oil chamber 140.

The vane rotor 130 has a plurality of vanes 131 and a boss 135 and is received at an inside of the housing 120. The boss 135 is shaped in a tubular form and is securely held between the end portion 321 of the camshaft 320 and a projection (also referred to as a flange) 35 of the outer sleeve 30 described later. Therefore, the vane rotor 130, which has the boss 135, is rotated integrally with the camshaft 320. A through-hole 136 extends through a center of the boss 135 in the axial direction of the rotational axis AX. The hydraulic oil control valve 10 is installed in the through-hole 136.

Each of the vanes 131 radially outwardly projects from the boss 135, which is located at the center of the vane rotor 130, such that the vanes 131 are arranged one after another in the circumferential direction. Each of the vanes 131 is received in a corresponding one of the hydraulic oil chambers 140 and partitions the corresponding hydraulic oil chamber 140 into a retard chamber 141 and an advance chamber 142 in the circumferential direction. The retard chamber 141 is located on one side of the vane 131 in the circumferential direction. The advance chamber 142 is located on the other side of the vane 131 in the circumferential direction.

The retard oil passages 138 and the advance oil passages 139 radially extend through the boss 135. Each of the retard oil passages 138 and an adjacent one of the advance oil passages 139 are arranged one after the other in the axial direction of the rotational axis AX. Each of the retard oil passages 138 communicates between a corresponding one of a plurality of retard ports 28 of the hydraulic oil control valve 10 described later and a corresponding one of the plurality of retard chambers 141 described later. Each of the advance oil passages 139 communicates between a corresponding one of a plurality of advance ports 29 of the hydraulic oil control valve 10 described later and a corresponding one of the plurality of advance chambers 142 described later. The outer sleeve 30 of the hydraulic oil control valve 10 seals between each retard oil passage 138 and each advance oil passage 139 in the through-hole 136. The hydraulic oil control valve 10 supplies the hydraulic oil to the retard chambers 141 or the advance chambers 142 through the retard oil passages 138 or the advance oil passages 139 depending on the position of the spool 60. The vane rotor 130 is rotated relative to the housing 120 in the retarding direction or the advancing direction according to the hydraulic oil pressure of the hydraulic oil supplied to the retard chambers 141 and the hydraulic oil pressure of the hydraulic oil supplied to the advance chambers 142. Therefore, the vane rotor 130 functions as a phase changer that is configured to change a phase of the driven shaft relative to the drive shaft.

A receiving hole 132 is formed to extend in the axial direction of the rotational axis AX in one of the vanes 131. The receiving hole 132 is communicated with the corresponding retard chamber 141 through a retard chamber side pin control oil passage 133 formed at the one of the vanes 131 and is communicated with the corresponding advance chamber 142 through an advance chamber side pin control oil passage 134 formed at the one of the vanes 131. A lock pin 150, which is configured to reciprocate in the direction AD and the direction AU, is received in the receiving hole 132. The lock pin 150 limits relative rotation of the vane rotor 130 relative to the housing 120 to limit a collision between the housing 120 and the vane rotor 130 in the circumferential direction in a state where the hydraulic oil pressure is insufficient. The lock pin 150 is urged by a spring 151 toward a fitting recess 128 (see FIG. 1) formed at the sprocket 121.

In the present embodiment, the housing 120 and the vane rotor 130 are made of an aluminum alloy. However, the material of the housing 120 and the vane rotor 130 is not limited to the aluminum alloy and may be any other metal material, such as iron, stainless steel, or any resin material.

Figure 3:
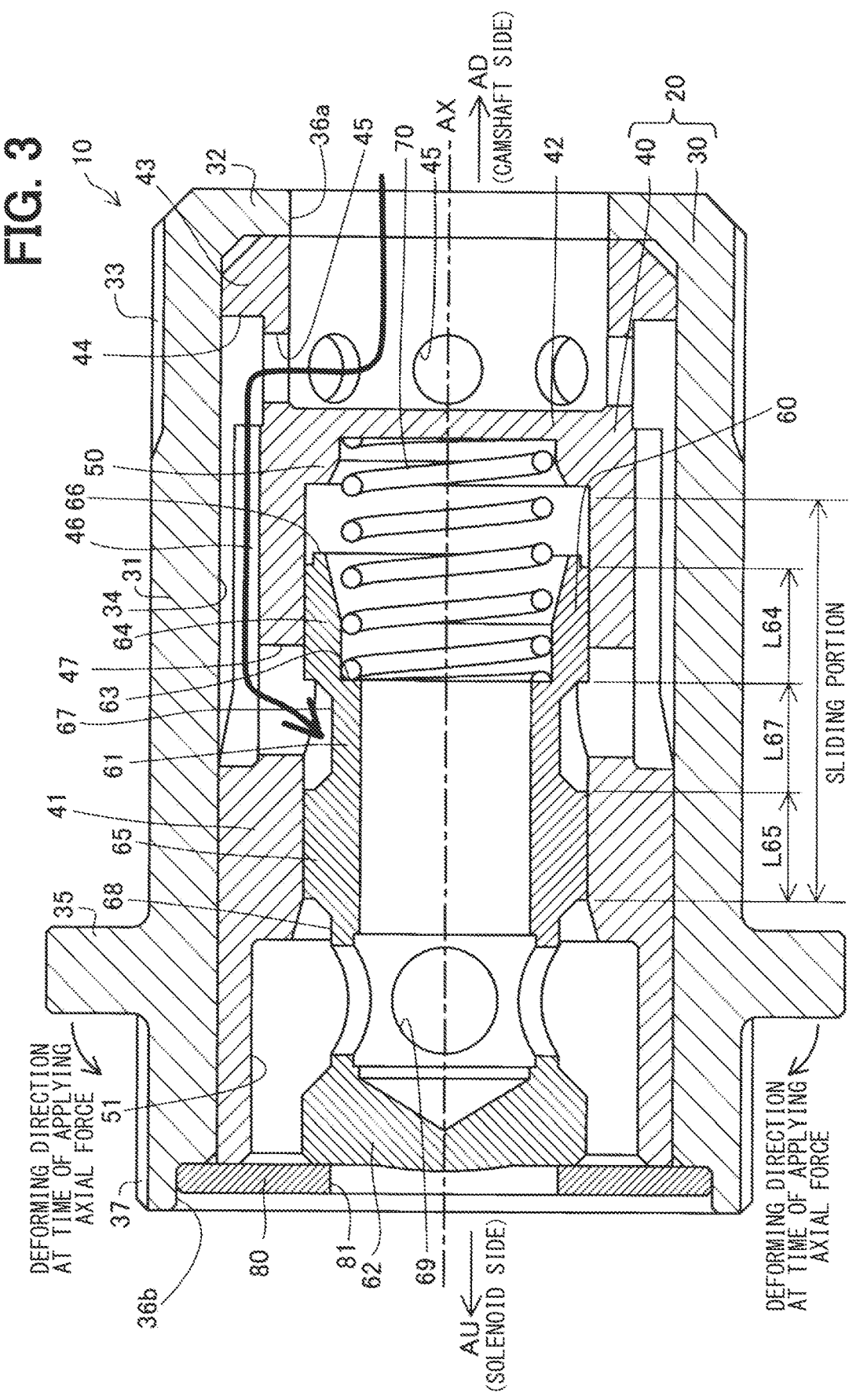
FIG. 3 is an explanatory diagram showing a detailed structure of the hydraulic oil control valve of the first embodiment.
Figure 4:
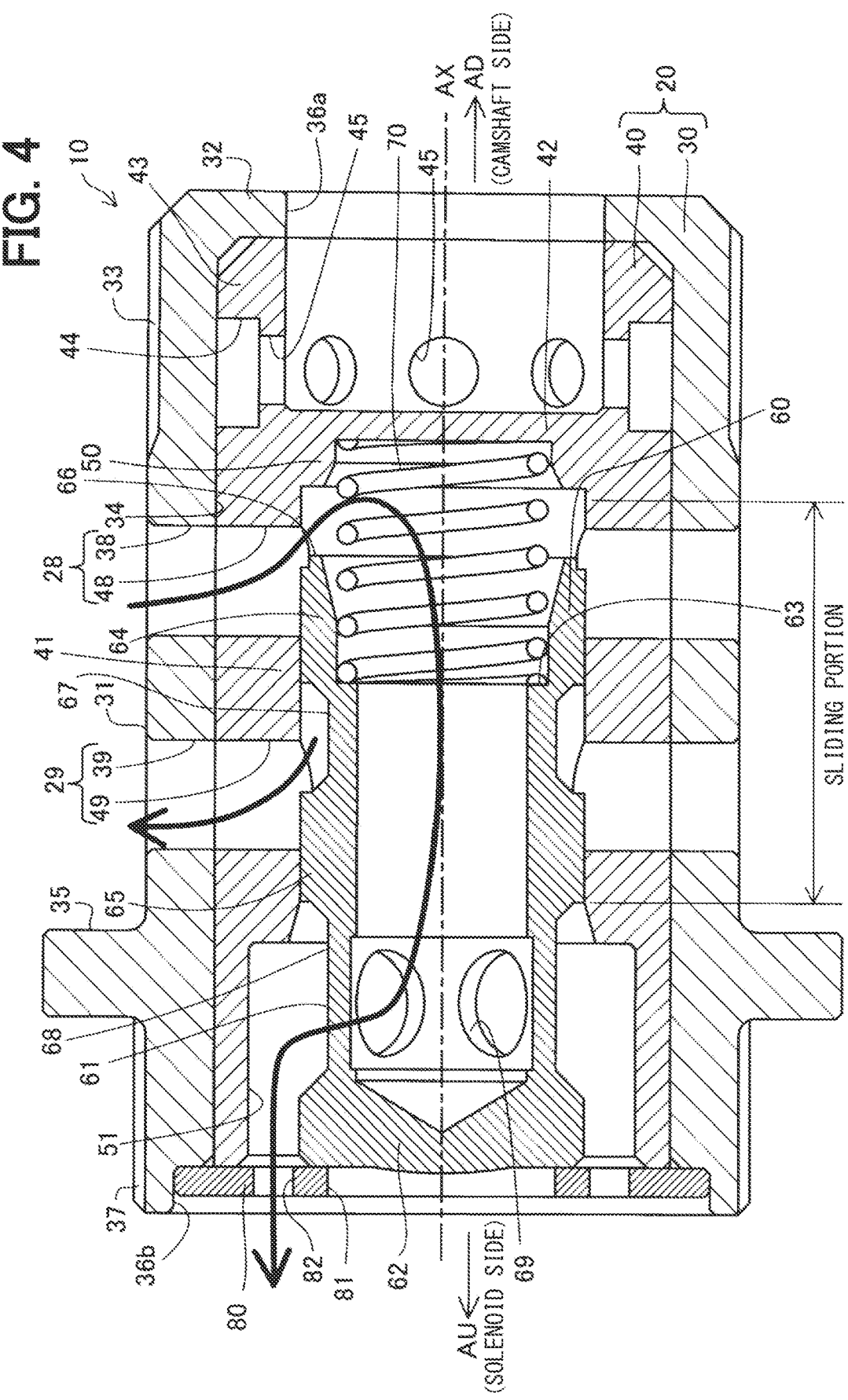
FIG. 4 is an explanatory diagram showing the detailed structure of the hydraulic oil control valve of the first embodiment.
Figure 5:
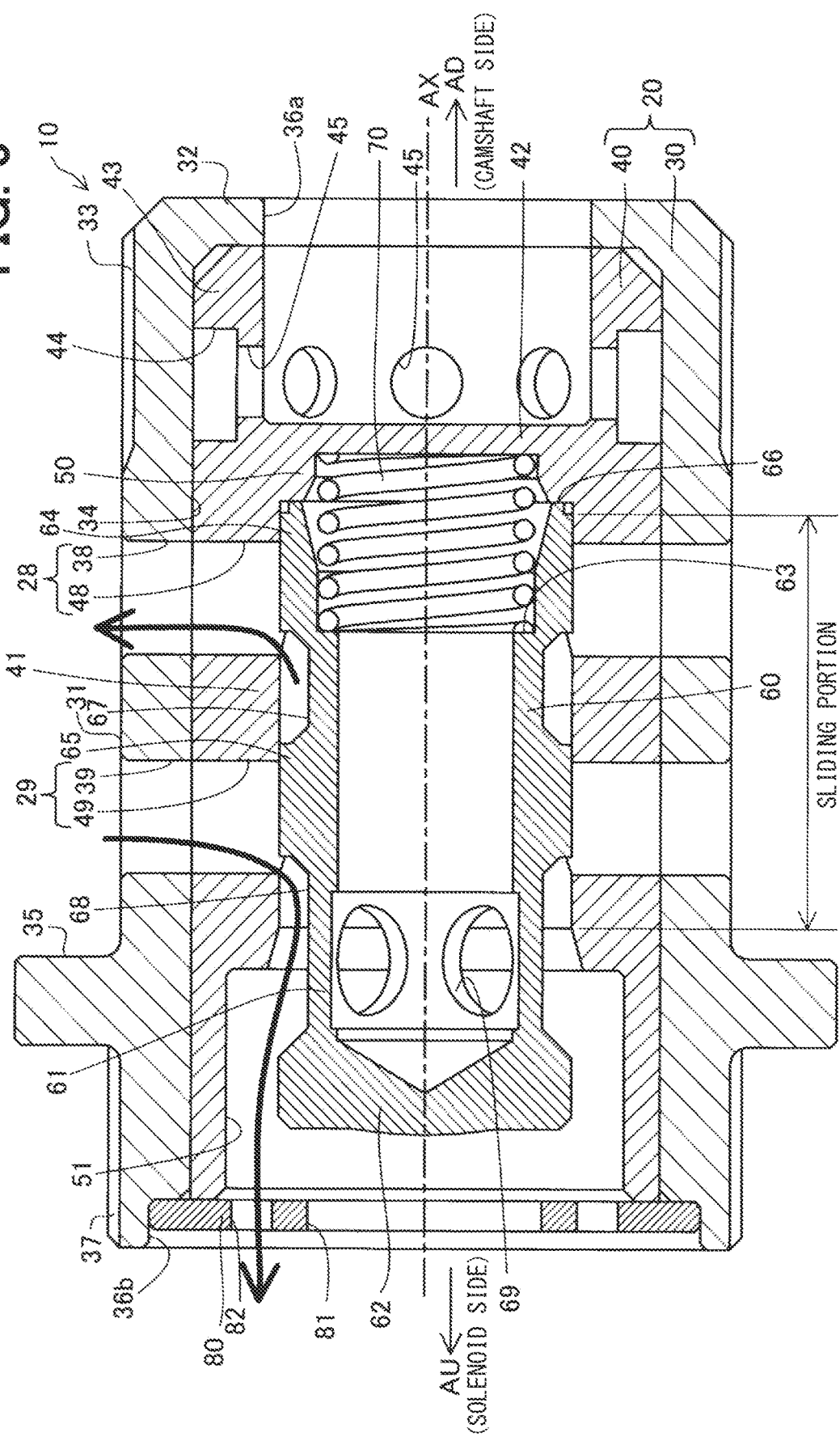
FIG. 5 is an explanatory diagram showing the detailed structure of the hydraulic oil control valve of the first embodiment.

As shown in FIGS. 3 to 5, the hydraulic oil control valve 10 includes the sleeve 20, the spool 60, the spring 70 and a stopper 80. FIG. 3 shows a partial cross-sectional view taken along a plane which extends along the rotational axis AX. FIG. 4 is a partial view taken along a plane that is rotated by 45 degrees about the rotational axis AX relative to the plane of FIG. 3 that extends along the rotational axis AX. Furthermore, FIG. 5 is a diagram showing a state where the spool 60 of FIG. 4 is moved in the direction AD by driving the solenoid 160.

The sleeve 20 includes the outer sleeve 30 and the inner sleeve 40. The outer sleeve 30 is a member that forms an outer shell of the hydraulic oil control valve 10 and is shaped in a cylindrical tubular form. The outer sleeve 30 has a main body portion 31, a bottom portion 32 and the projection 35.

The main body portion 31 is shaped in a cylindrical tubular form and has an axial hole 34 that extends along the rotational axis AX. The axial hole 34 extends through the outer sleeve 30 along the rotational axis AX. An end of the main body portion 31 opens in the direction AU. The outer retard ports 38 and the outer advance ports 39, which serve as a plurality of outer sleeve ports (also two types of outer sleeve ports), are formed in the main body portion 31 at two locations, respectively, arranged one after another in the axial direction of the rotational axis AX. The outer retard ports 38 are arranged one after another in the circumferential direction and communicate between an outer peripheral surface of the main body portion 31 and the axial hole 34. The outer advance ports 39 are located on the AU side of the outer retard ports 38 in the axial direction of the rotational axis AX. The outer advance ports 39 are arranged one after another in the circumferential direction and communicate between the outer peripheral surface of the main body portion 31 and the axial hole 34. The main body portion 31 of the hydraulic oil control valve 10 is inserted into the through-hole 136 of the vane 131 shown in FIG. 2 such that the outer retard ports 38 are communicated with the retard oil passages 138, and the outer advance ports 39 are communicated with the advance oil passages 139.

A bottom portion 32 is formed at an end portion of the main body portion 31 located on a side (hereinafter also referred to as an AD side) in the direction AD. The end portion of the inner sleeve 40, which is located on the AD side, contacts the bottom portion 32. Specifically, the bottom portion 32 defines a position of the inner sleeve 40 press-fitted into the outer sleeve 30. An opening 36a is formed at the center of the bottom portion 32. The end portion of the main body portion 31, which is located on the AU side, has an insertion opening 36b, into which the inner sleeve 40 is inserted.

The projection 35 radially outwardly projects from the main body portion 31. A male-threaded portion 37 is formed at a portion of the outer sleeve 30 which is located on the AU side of the projection 35. When a nut is threadably coupled to the male-threaded portion 37, the vane rotor 130 is clamped between the projection 35 and the end portion 321 of the camshaft 320. Therefore, the outer sleeve 30, the vane rotor 130 and the camshaft 320 are fixed together and are rotated in the same phase.

The inner sleeve 40 is shaped in a cylindrical tubular form and is inserted into the axial hole 34 of the outer sleeve 30. The inner sleeve 40 is inserted into the axial hole 34 by, for example, press-fitting. The inner sleeve 40 may be fixed to the outer sleeve 30 by any other suitable method, which is other than the press-fitting, such as threadably fixing the inner sleeve 40 to the outer sleeve 30.

Figure 6:
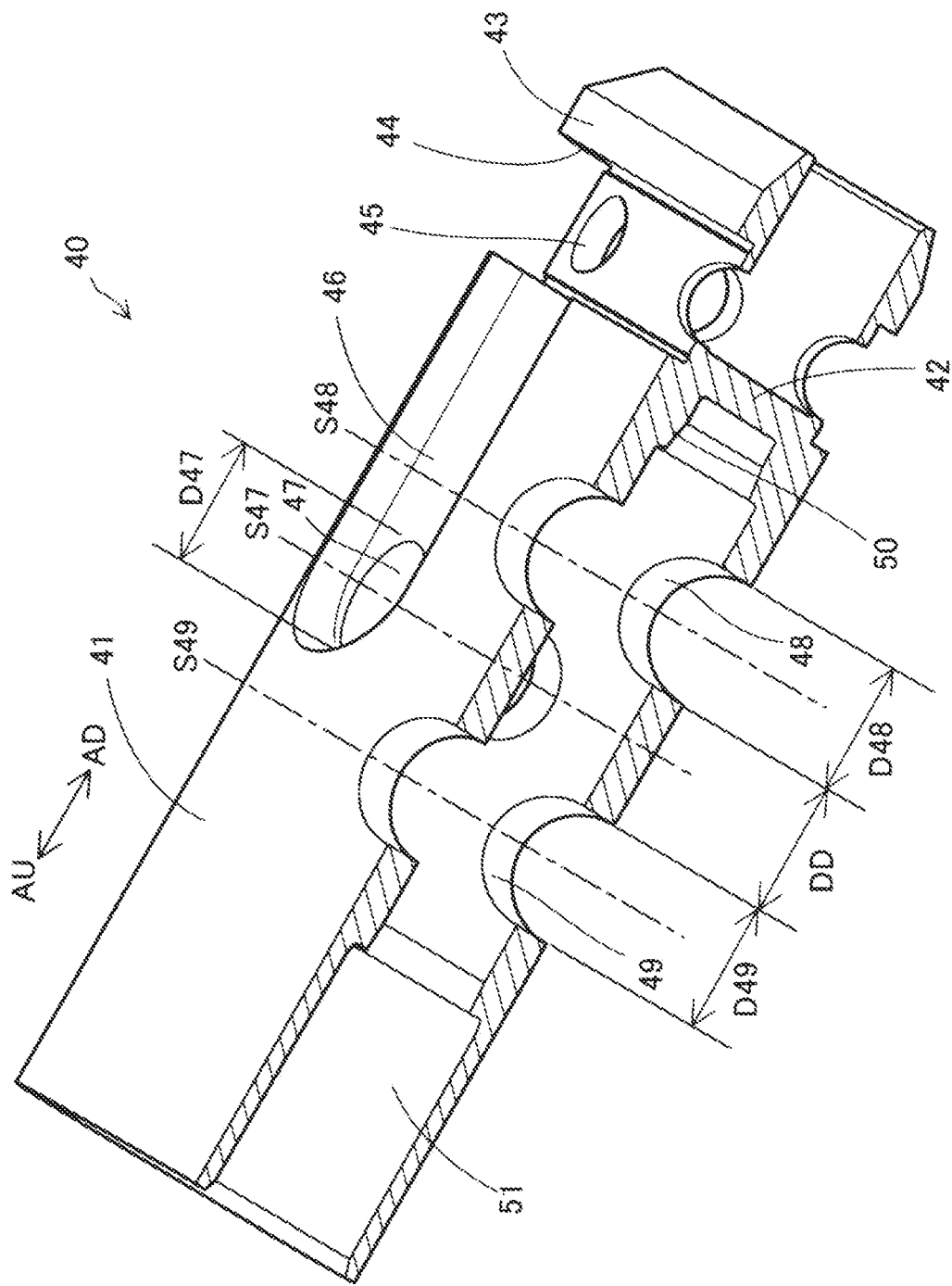
FIG. 6 is an explanatory diagram showing a structure of an inner sleeve.

As shown in FIG. 6, the inner sleeve 40 has a first tubular portion 41, a bottom portion 42, a second tubular portion 43, a circumferential groove 44, a plurality of supply ports 45, an axial groove 46, a plurality of oil ports 47, a plurality of inner retard ports 48, a plurality of inner advance ports 49, a stepped portion 50 and an enlarged diameter portion 51. The plurality of inner retard ports 48 and the plurality of inner advance ports 49 serve as a plurality of inner sleeve ports (also two types of inner sleeve ports).

In the inner sleeve 40, the first tubular portion 41 is located on the AU side of the closed bottom portion 42, and the second tubular portion 43 is located on the AD side of the closed bottom portion 42. The first tubular portion 41 and the second tubular portion 43 are respectively shaped in a generally tubular form. The circumferential groove 44 is formed to extend along the outer periphery on the bottom portion 42 side of the second tubular portion 43. The supply ports 45, which communicate between an outside and an inside of the second tubular portion 43, are formed at the circumferential groove 44.

The axial groove 46, which is parallel with the rotational axis AX, is formed at the outer periphery of the first tubular portion 41. An end portion of the axial groove 46, which is located on the AU side, is communicated with the circumferential groove 44. The oil ports 47, which communicate between an outside and an inside of the first tubular portion 41, are formed at the end portion of the axial groove 46, which is located on the AU side. The first tubular portion 41 has the inner retard ports 48, which are arranged one after another in the circumferential direction, and the inner advance ports 49, which are arranged one after another in the circumferential direction. The oil ports 47, the inner retard ports 48 and the inner advance ports 49 are not communicated with each other in the inner sleeve 40.

As shown in FIGS. 3 to 5, each of the inner retard ports 48 is located at a corresponding position which corresponds to a corresponding one of the outer retard ports 38 of the outer sleeve 30, and each of the inner advance ports 49 is located at a corresponding position which corresponds to a corresponding one of the outer advance ports 39 of the outer sleeve 30. Each of the outer retard ports 38 and the corresponding one of the inner retard ports 48 form the retard port 28 and are communicated with a corresponding one of the retard chamber 141 through the corresponding retard oil passage 138 shown in FIG. 2. Each of the outer advance ports 39 and the corresponding one of the inner advance ports 49 form the advance port 29 that is communicated with the corresponding advance chamber 142 through the corresponding advance oil passage 139 shown in FIG. 2.

A plane S48, which extends through a center of each of the inner retard ports 48 and is perpendicular to the rotational axis AX, is located on the AD side of a plane S47, which extends through a center of each of the oil ports 47 and is perpendicular to the rotational axis AX. A plane S49, which extends through a center of each of the inner advance ports 49 and is perpendicular to the rotational axis AX, is located on the AU side of the plane S47, which extends through the center of each of the oil ports 47 and is perpendicular to the rotational axis AX. Furthermore, an opening diameter D47 of each of the oil ports 47 is larger than a distance DD between the inner retard port 48 and the inner advance port 49 in the axial direction of the rotational axis AX. Specifically, the distance DD is smaller than the opening diameter D47.

The stepped portion 50 is formed at the inside of the first tubular portion 41 at a location that is adjacent to the bottom portion 42. An inner diameter of the first tubular portion 41 is small at the stepped portion 50. As shown in FIG. 5, when the spool 60 is driven by the solenoid 160 in a direction away from the electromagnetic device 162, the stepped portion 50 contacts the end portion of the spool 60 which is located on the AD side. Specifically, the stepped portion 50 defines a sliding limit of the spool 60 which is located on the AD side. The spring 70 is placed at the inside of the stepped portion 50. The first tubular portion 41 has the enlarged diameter portion 51 which has an inner diameter increased relative an adjacent part of the first tubular portion 41 that is adjacent to the enlarged diameter portion 51 while the enlarged diameter portion 51 is located on the AU side of the inner advance ports 49.

The spool 60 is located on the radially inner side of the inner sleeve 40. The spool 60 is driven by the solenoid 160, which is in contact with one end of the spool 60, such that the spool 60 is slid in the direction AD or the direction AU and is thereby reciprocated forward or backward in the inside of the inner sleeve 40 in response to the balance between the urging force of the solenoid 160 and the preload of the spring 70.

The spool 60 has a spool tubular portion 61, a spool bottom portion 62, a spring receiving portion 63, a first land portion 64, a second land portion 65, an inner sleeve contact portion 66 and a plurality of spool ports 69.

The spool tubular portion 61 is shaped in a cylindrical tubular form. The spool bottom portion 62 is formed at the solenoid 160 side end portion of the spool 60, i.e., the end portion of the spool 60 located on the AU side. The spool bottom portion 62 forms a land-shaped portion that radially outwardly projects from the outer peripheral surface of the spool tubular portion 61, and an outer diameter of the spool bottom portion 62 is larger than an outer diameter of the spool tubular portion 61. The spool bottom portion 62 is located at a position where the spool bottom portion 62 is opposed to the enlarged diameter portion 51 of the inner sleeve 40 regardless of the position of the spool 60. The inner sleeve contact portion 66 is formed at an end portion of the spool tubular portion 61, which is opposite to the solenoid 160, i.e., is on the AD side. As shown in FIG. 5, the inner sleeve contact portion 66 is a portion of the spool 60, which contacts the stepped portion 50 of the inner sleeve 40, when the spool 60 is most spaced away from the electromagnetic device 162 of the solenoid 160.

The first land portion 64 and the second land portion 65 are formed at the outer peripheral surface of the spool tubular portion 61. The first land portion 64 and the second land portion 65 project radially outward from the outer peripheral surface of the spool tubular portion 61 along the entire circumferential extent of the spool tubular portion 61. The first land portion 64 and the second land portion 65 are arranged in this order from the camshaft 320 side in the axial direction of the rotational axis AX. An outer diameter of a portion between the first land portion 64 and the second land portion 65 is the same as the outer diameter of the spool tubular portion 61 but is smaller than the outer diameter of the first land portion 64 and the outer diameter of the second land portion 65. The portion between the first land portion 64 and the second land portion 65 is shaped in a form of a circumferential groove, which is radially recessed relative to the first land portion 64 and the second land portion 65, so that this portion will be referred to as a first circumferential groove 67 for the sake of convenience. The first circumferential groove 67 serves as a spool groove. The first land portion 64 and the second land portion 65 contact and slide relative to the inner peripheral surface of the inner sleeve 40. A length L64 of the first land portion 64, which is measured in the axial direction of the rotational axis AX, is larger than an opening diameter D48 of each of the inner retard ports 48. A length L65 of the second land portion 65, which is measured in the axial direction of the rotational axis AX, is larger than an opening diameter D49 of each of the inner advance ports 49. Furthermore, a width L67 of the first circumferential groove 67, which is measured in the axial direction of the rotational axis AX, is smaller than the distance DD between the inner retard port 48 and the inner advance port 49, which is measured in the axial direction of the rotational axis AX. Therefore, one of each inner retard port 48 and each inner advance port 49 can be closed depending on the position of the spool 60, more specifically, the position of the first circumferential groove 67.

An outer diameter of a portion between the second land portion 65 and the spool bottom portion 62 is the same as the outer diameter of the spool tubular portion 61 but is smaller than the outer diameter of the second land portion 65 and the outer diameter of the spool bottom portion 62. The portion between the second land portion 65 and the spool bottom portion 62 will be referred to as a second circumferential groove 68 for the sake of convenience. The second circumferential groove 68 is opposed to the enlarged diameter portion 51 of the inner sleeve 40 and does not contact the inner sleeve 40. The spool ports 69, which communicate between an outside and an inside of the spool 60, are formed at a bottom of the second circumferential groove 68. The spool ports 69 function as holes which discharge the hydraulic oil from the inside of the spool 60 to the outside of the spool 60.

The spring receiving portion 63 has an inner diameter that is larger than that of the other portion of the spool tubular portion 61. An end portion of the spring 70, which is located on the solenoid 160 side, i.e., the AU side, contacts the spring receiving portion 63.

The stopper 80 is press-fitted into the insertion opening 36b of the outer sleeve 30 after inserting the inner sleeve 40 and the spool 60 into the outer sleeve 30. A through-hole 81, through which the shaft 164 of the solenoid 160 extends, is formed at the center of the stopper 80, and a plurality of drain holes 82, which discharge the hydraulic oil, are formed at the stopper 80 at a location around the through-hole 81. The through-hole 81 functions as a drain hole in the state shown in FIG. 5. In the state shown in FIG. 3, the stopper 80 contacts the spool bottom portion 62 of the spool 60. Specifically, the stopper 80 defines a sliding limit of the spool 60 in the direction toward the electromagnetic device 162 of the solenoid 160.

In the present embodiment, the outer sleeve 30 and the spool 60 shown in FIG. 3 are made of iron, and the inner sleeve 40 is made of aluminum. The inner sleeve 40 may be made of iron. It is preferred that the inner sleeve 40 is made of a single material. In this way, the diameter of the enlarged diameter portion 51 is not limited by a thickness of a compound material and can be set to the optimum size based on the strength and the flow pressure loss. The materials of these members are not limited to the materials discussed above, and each of these members may be made of any other metal material or any resin material.

In the present embodiment, the crankshaft 310 corresponds to a subordinate concept of a drive shaft of the present disclosure, and the camshaft 320 corresponds to a subordinate concept of a driven shaft of the present disclosure. Furthermore, the intake valves 330 correspond to a subordinate concept of valves of the present disclosure. The solenoid 160 corresponds to a subordinate concept of an actuator of the present disclosure.

A-2. Operation of Valve Timing Adjusting Device:

In a case where the relative rotational phase of the camshaft 320 is on the retard side of a target value, the amount of electric power supply to the solenoid 160 is made relatively small at the valve timing adjusting device 100. In this case, as shown in FIGS. 3 and 4, the spool 60 is placed in a state where the spool 60 is positioned closest to the electromagnetic device 162 of the solenoid 160. In this state, the inner sleeve contact portion 66 of the spool 60 and the stepped portion 50 of the inner sleeve 40 are spaced from each other, and the inner retard ports 48 are communicated with the inside of the spool 60. Furthermore, the inner advance ports 49 are communicated with the first circumferential groove 67. The hydraulic oil is supplied from the oil pump 351 of FIG. 1 to the advance chambers 142 through: the supply hole 326, the shaft hole 322 and the opening 36a; and then the second tubular portion 43, the supply ports 45, the circumferential groove 44, the axial groove 46 and the oil ports 47 of the inner sleeve 40; and the first circumferential groove 67 and the advance ports 29 shown in FIGS. 3 to 6; and thereafter the advance oil passages 139 shown in FIG. 2. Therefore, the vane rotor 130 is rotated relative to the housing 120 in the advancing direction. The hydraulic oil, which is accumulated in the retard chambers 141, is discharged to the outside of the hydraulic oil control valve 10 through: the retard oil passages 138 shown in FIG. 2; the retard ports 28; the gap between the inner sleeve contact portion 66 and the stepped portion 50; the inside of the spool 60; the spool ports 69; the gap between the enlarged diameter portion 51 of the inner sleeve 40 and the spool bottom portion 62 of the spool 60; the drain holes 82 of the stopper 80; and the insertion opening 36b shown in FIGS. 3 to 6. Then, the hydraulic oil, which is discharged from the hydraulic oil control valve 10, is returned to the oil pan 352 shown in FIG. 1.

In a case where the relative rotational phase of the camshaft 320 is on the advance side of the target value, the amount of electric power supply to the solenoid 160 is made relatively large at the valve timing adjusting device 100. In this case, as shown in FIG. 5, the spool 60 is placed in a state where the spool 60 is positioned farthest from the electromagnetic device 162 of the solenoid 160. In this state, the inner retard ports 48 are communicated with the first circumferential groove 67. Furthermore, the inner advance ports 49 are communicated with the second circumferential groove 68. The hydraulic oil is supplied from the oil pump 351 of FIG. 1 to the retard chambers 141 through: the supply hole 326, the shaft hole 322 and the opening 36a; and then the second tubular portion 43, the supply ports 45, the circumferential groove 44, the axial groove 46 and the oil ports 47 of the inner sleeve 40; and the first circumferential groove 67 and the retard ports 28 shown in FIGS. 3 to 6; and thereafter the retard oil passages 138 shown in FIG. 2. Therefore, the vane rotor 130 is rotated relative to the housing 120 in the retarding direction. The hydraulic oil, which is accumulated in the advance chambers 142, is discharged to the outside of the hydraulic oil control valve 10 through: the advance oil passages 139 shown in FIG. 2; the advance ports 29; the second circumferential groove 68; the gap between the enlarged diameter portion 51 of the inner sleeve 40 and the spool bottom portion 62 of the spool 60; the drain holes 82 of the stopper 80; and the insertion opening 36b shown in FIGS. 3 to 6. Then, the hydraulic oil, which is discharged from the hydraulic oil control valve 10, is returned to the oil pan 352 shown in FIG. 1.

According to the above-described embodiment, the sliding portion (the sliding surface), at which the land portions 64, 65 of the spool 60 are slid relative to the inner surface of the inner sleeve 40, can be placed between the projection 35 and the opening 36a. Thus, the distance between the ports 48 and the ports 49 can be reduced. Thereby, even when the axial force is applied to the outer sleeve 30, the amount of deformation of the outer sleeve 30 around the sliding portion can be reduced.

According to the present embodiment, since the inner sleeve 40 has the enlarged diameter portion 51, the pressure loss of the hydraulic oil, which flows in the enlarged diameter portion 51, can be reduced.

In the present embodiment, a cross-sectional area of an opening, which is formed by overlapping an open hole of each of the outer sleeve ports 38, 39 and an open hole of the overlapping one of the inner sleeve ports 48, 49, which overlaps with this one of the outer sleeve ports 38, 39, may be set such that this cross-sectional area of the opening does not become a smallest cross-sectional area in the oil flow passage from the oil ports to the drain oil flow passage. With this configuration, the oil can smoothly flow between the outer sleeve port 38, 39 and the inner sleeve port 48, 49 without being largely influenced by a throttling part or a bending part between the outer sleeve port 38, 39 and the inner sleeve port 48, 49, and thereby it is possible to limit an increase in the pressure loss. Each of the outer sleeve ports 38, 39 and the corresponding one of the inner sleeve ports 48, 49 may be configured such that the outer sleeve port 38, 39 and the inner sleeve port 48, 49 open straight in the radial direction of the central axis of the hydraulic oil control valve and have an identical shape in a view taken from the central axis. In this way, the cross-sectional area of the opening, which is formed by overlapping the open hole of the outer sleeve port 38, 39 and the open hole of the inner sleeve port 48, 49 can be easily made large.

In the present embodiment, the distance DD between the inner sleeve port 48 and the inner sleeve port 49 may be set to be smaller than the opening diameter D47 of each of the oil ports 47. When the distance DD between the inner sleeve port 48 and the inner sleeve port 49 is reduced, the length from the projection 35 to the opening can be reduced. Thus, even when the axial force is applied to the outer sleeve 30, the deformation of the outer sleeve 30 around the sliding portion can be reduced. Furthermore, the amount of the material, which forms the inner sleeve 40, can be reduced, and thereby the manufacturing costs can be reduced.

In the present embodiment, since the axial groove 46 does not overlap with the enlarged diameter portion 51 in the axial direction of the rotational axis AX, the required strength can be ensured without increasing the thickness of the inner sleeve 40.

In the present embodiment, the stopper 80, which limits the movement of the spool 60 toward the solenoid 160, may be provided, and the spool 60 may have the spool bottom portion 62, which has the land-shaped portion and is configured to contact the stopper 80, and the spool bottom portion 62 may be placed at the position where the spool bottom portion 62 is opposed to the enlarged diameter portion 51 regardless of the position of the spool 60. According to this configuration, since the spool bottom portion 62 has the land-shaped portion having the increased diameter, a contact surface area between the spool bottom portion 62 and the stopper 80 can be increased to improve the reliability. Furthermore, since the enlarged diameter portion 51 does not overlap with the sliding portion in the axial direction of the rotational axis AX, the discharge pressure loss of the drain oil can be reduced.

Figure 7:
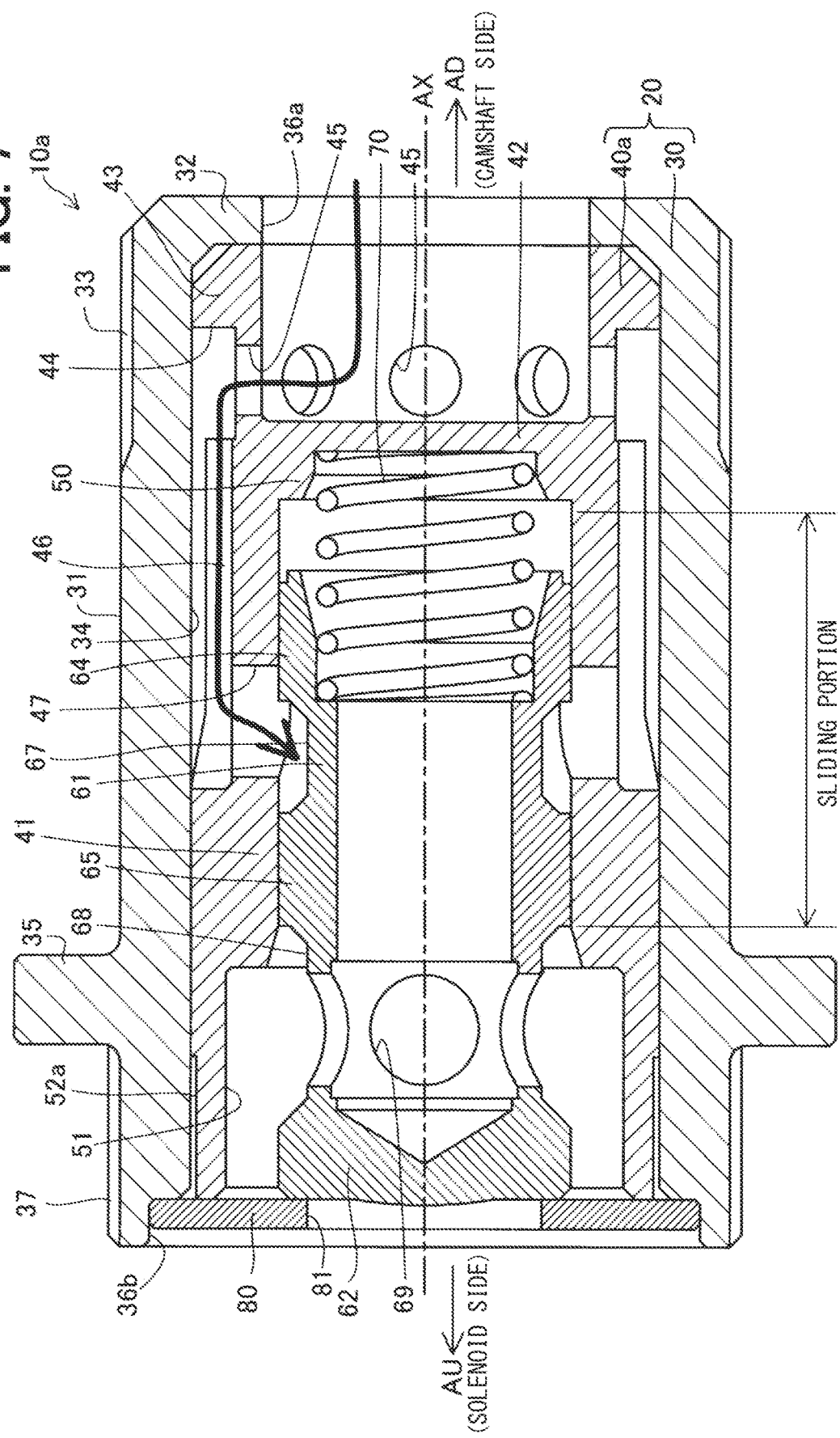
FIG. 7 is an explanatory diagram showing a detailed structure of a hydraulic oil control valve of a modification of the first embodiment.

A-3. Modification:

In the hydraulic oil control valve 10a of a modification shown in FIG. 7, an outer diameter of an end portion 52 of the first tubular portion 41 of the inner sleeve 40 is reduced on the solenoid 160 side of the projection 35 of the outer sleeve 30. Therefore, a clearance is formed between the outer sleeve 30 and the inner sleeve 40 at the location which is on the solenoid 160 side of the projection 35. As described in the first embodiment, the nut is threadably coupled to the male-threaded portion 37 at the time of fixing the hydraulic oil control valve 10 and vane rotor 130 together. At this time, the portion of the outer sleeve 30, which is located on the solenoid 160 side of the projection 35, may be radially shrunk by tightening the nut in some cases. In the present modification, since the clearance is formed between the outer sleeve 30 and the inner sleeve 40 at the location which is on the solenoid 160 side of the projection 35, it is possible to limit deformation of the inner sleeve 40 even when the outer sleeve 30 is radially shrunk.

Figure 8:
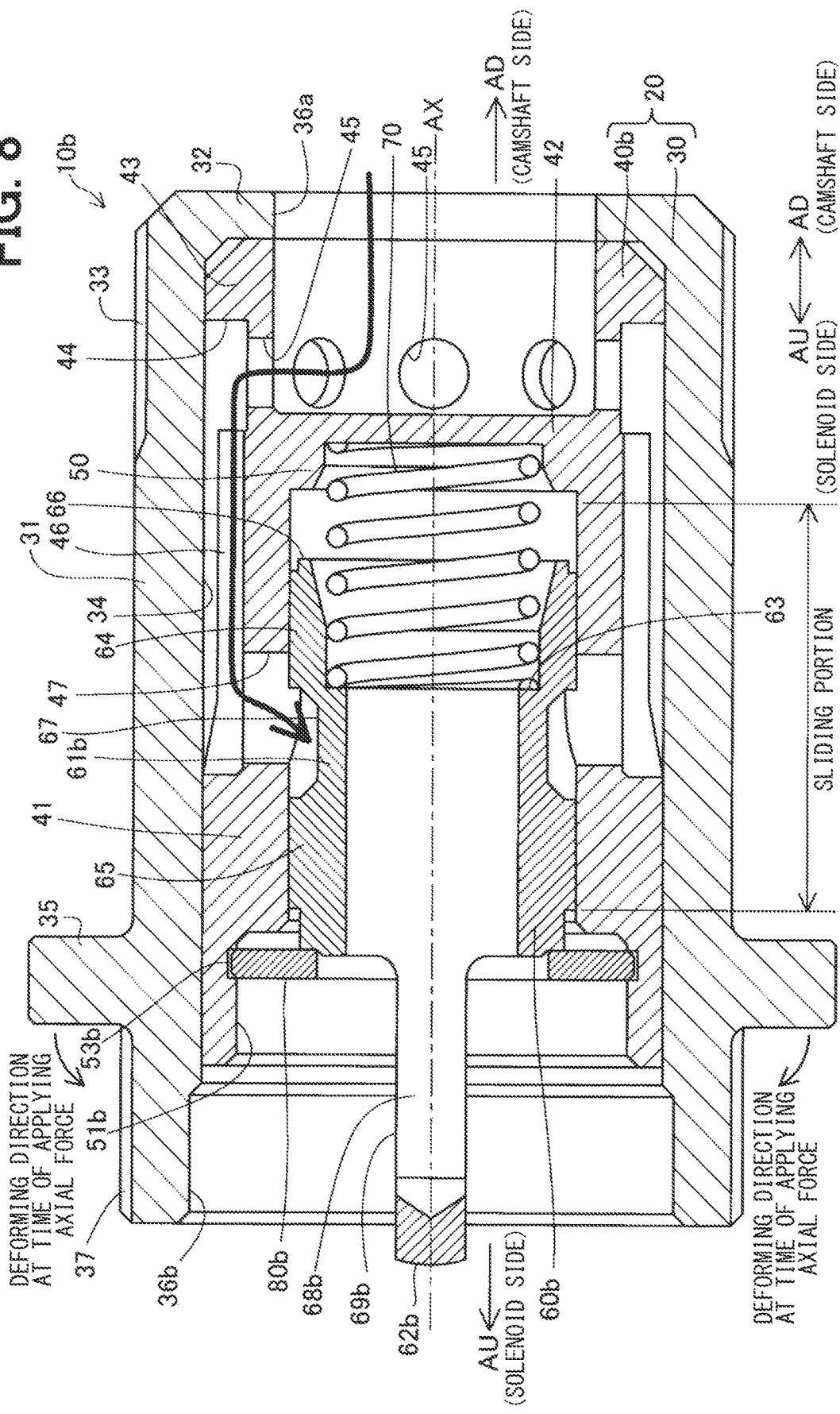
FIG. 8 is an explanatory diagram showing a detailed structure of a hydraulic oil control valve of a second embodiment.
Figure 9:
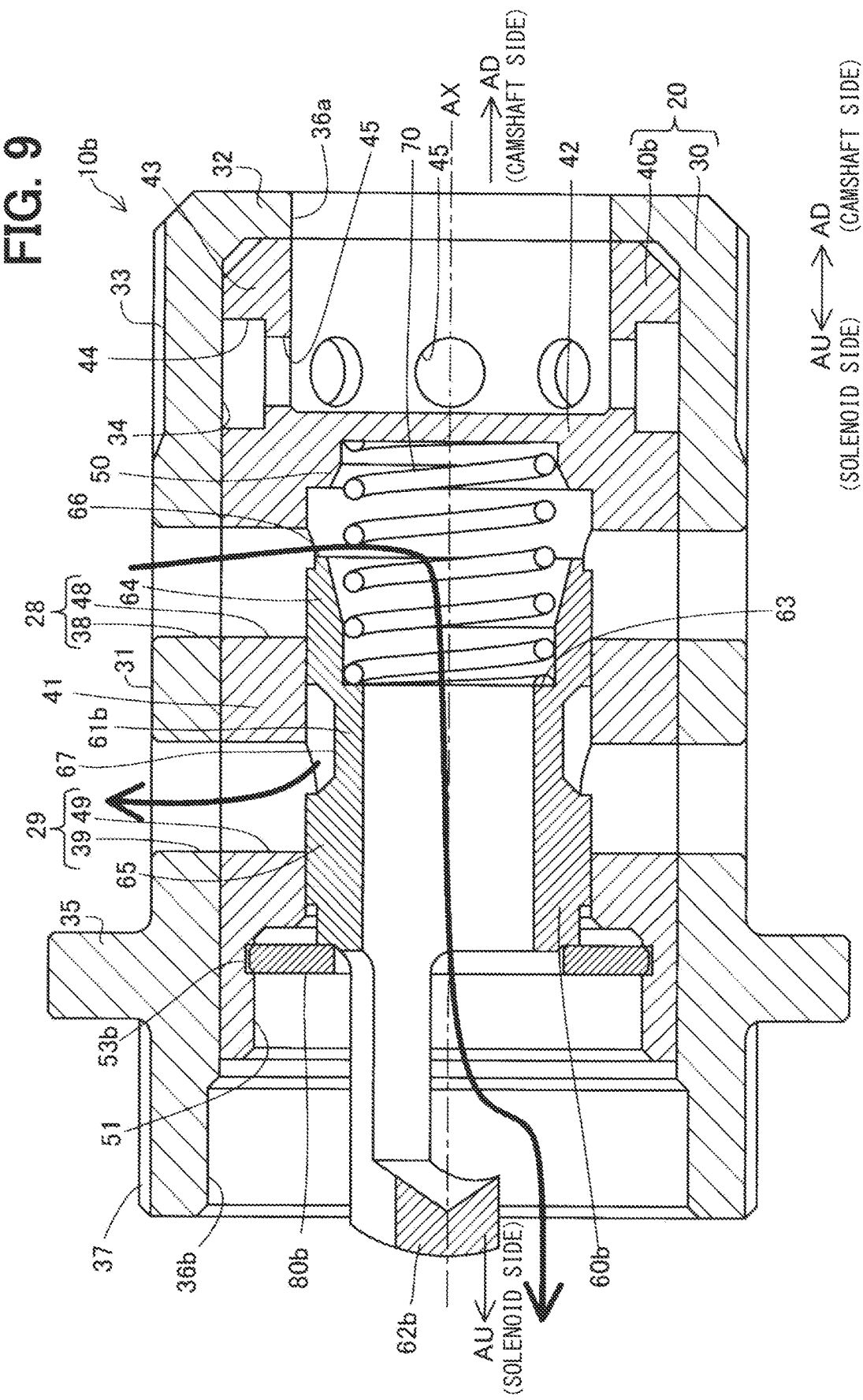
FIG. 9 is an explanatory diagram showing the detailed structure of the hydraulic oil control valve of the second embodiment.
Figure 10:
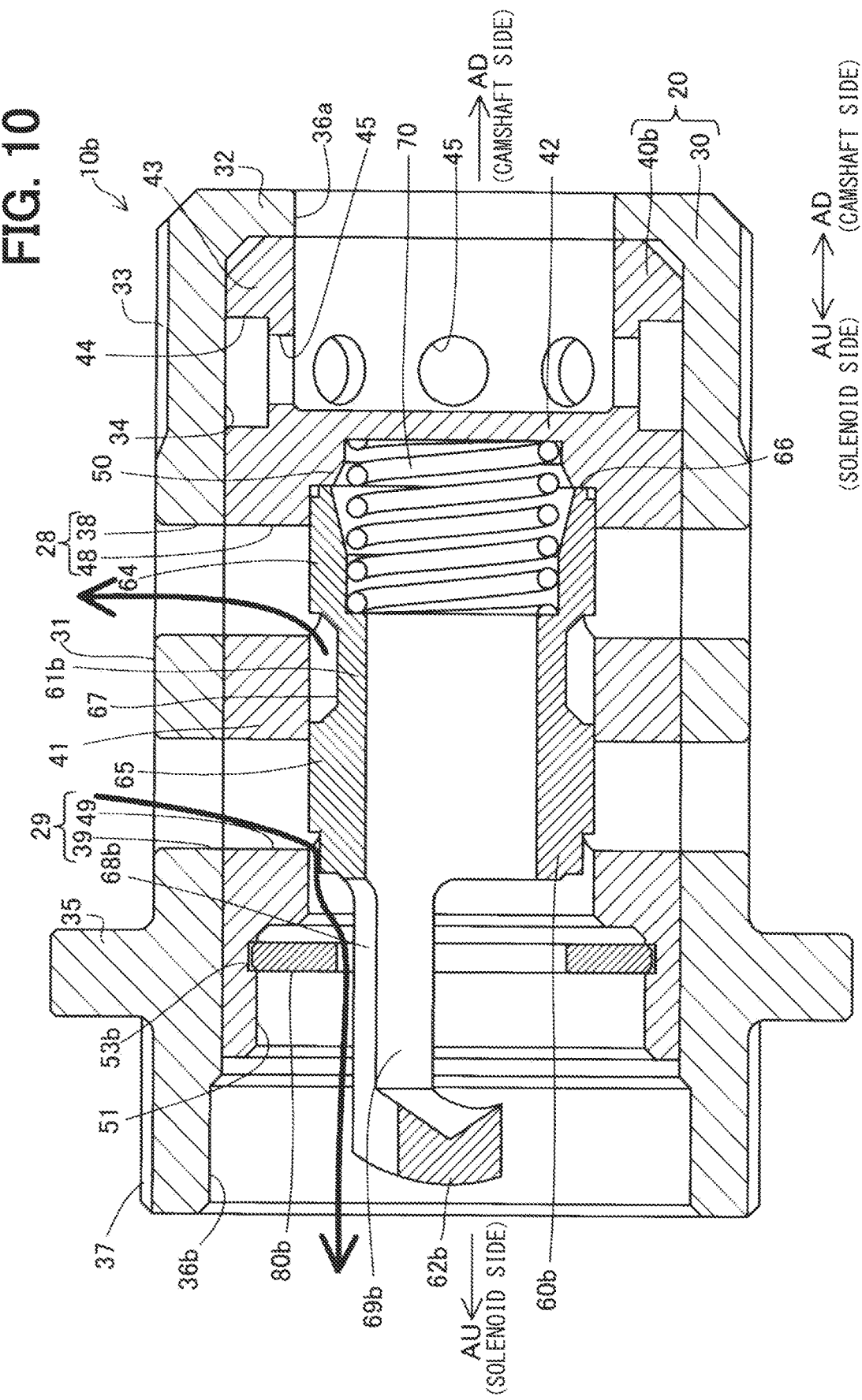
FIG. 10 is an explanatory diagram showing the detailed structure of the hydraulic oil control valve of the second embodiment.

In the example shown in FIG. 7, the outer diameter of the end portion 52 of the first tubular portion 41 of the inner sleeve 40a is reduced. Alternatively, the inner diameter of a portion of the outer sleeve 30, which is opposed to the end portion 52, may be increased. Further alternatively, the outer diameter of the end portion 52 of the first tubular portion 41 of the inner sleeve 40a may be reduced, and the inner diameter of the portion of the outer sleeve 30, which is opposed to the end portion 52, may be increased. B. Second Embodiment:

The hydraulic oil control valve 10b of a second embodiment shown in FIGS. 8 to 10 differs from the hydraulic oil control valve 10 of the first embodiment with respect to the shape and the position of the inner sleeve 40b, the spool 60b and the stopper 80b. Hereinafter, these differences will be described.

The length of the inner sleeve 40b, which is measured in the axial direction of the rotational axis AX, is reduced in comparison to the inner sleeve 40 of the first embodiment. Specifically, the length of the enlarged diameter portion 51 is reduced. A groove 53b, which increases the inner diameter, is formed at the inner peripheral surface of the enlarged diameter portion 51, and the stopper 80b is fitted into the groove 53b. In the first embodiment, the stopper 80 is fitted to the outer sleeve 30. In contrast, in the second embodiment, the stopper 80b is fitted to the inner sleeve 40b. The position of the stopper 80b in the axial direction of the rotational axis AX is substantially the same as the position of the projection 35 of the outer sleeve 30.

The length of the spool 60b, which is measured in the axial direction of the rotational axis AX, is substantially the same as the length of the spool 60 of the first embodiment, which is measured in the axial direction of the rotational axis AX. However, the spool bottom portion 62b is shaped generally in an oblong rectangle form in a view taken in the axial direction. A major diameter of the spool bottom portion 62b is substantially the same as the outer diameter of the spool tubular portion 61b, and the diameter of the spool bottom portion 62b is not enlarged. Two connecting portions 68b connect between the spool tubular portion 61b and the spool bottom portion 62b. An outer diameter of a circle, which contains the connecting portions 68b and is perpendicular to the rotational axis AX, is substantially the same as the outer diameter of the spool tubular portion 61b. A space between the two connecting portions 68b functions as a spool port 69b, through which the hydraulic oil is discharged from the inside of the spool 60 to the outside of the spool 60.

With this configuration, like the first embodiment, the sliding portion is located on the male-threaded portion 33 side of the stopper 80b, so that even when the axial force is applied to the outer sleeve 30, the deformation of the sliding portion can be limited.

With this configuration, even when the outer sleeve 30 is radially shrunk at the time of threadably coupling the nut to the male-threaded portion 37 of the outer sleeve 30, the deformation of the inner sleeve 40b can be limited.

In each of the above embodiments, the axial groove 46 is formed at the outer periphery of the inner sleeve 40. Alternatively or additionally, the axial groove may be formed at the inner surface of the outer sleeve 30.

In each of the above embodiments, there is described the example where the hydraulic oil is supplied from the opening 36a of the hydraulic oil control valve 10 and is discharged to the insertion opening 36b. Alternatively, the hydraulic oil may be supplied from the insertion opening 36b of the hydraulic oil control valve 10 and may be discharged to the opening 36a.

The present disclosure is not limited to the above-described embodiments and modifications, and can be realized in various configurations within a range not deviating from the gist thereof. For example, the technical features of the embodiments and modifications corresponding to the technical features in the summary of the invention can be appropriately replaced or combined to solve a part or all of the above-mentioned disadvantages or to achieve a part of all of the above-mentioned advantages. Furthermore, if the technical feature(s) is not described as essential in the present specification, it can be appropriately deleted.

What is claimed is:

1. A hydraulic oil control valve configured to control a hydraulic oil pressure of hydraulic oil to be supplied to a valve timing adjusting device that is placed between a crankshaft and a camshaft of an internal combustion engine and is configured to adjust an opening timing and a closing timing of a valve by changing a phase of a phase changer placed between the crankshaft and the camshaft, the hydraulic oil control valve comprising:
    an outer sleeve, which is shaped in a cylindrical tubular form;
    an inner sleeve, which is shaped in a cylindrical tubular form and is located on an inner side of the outer sleeve; and
    a spool, which is shaped in a cylindrical tubular form and is placed on an inner side of the inner sleeve, wherein the spool is configured to be slid along the inner sleeve when the spool is driven by an actuator that is placed at an end portion of the hydraulic oil control valve, which is opposite to the camshaft;
    the outer sleeve has:
        an opening, which is formed at one end portion of the outer sleeve located on a side where the camshaft is placed, and an insertion opening, which is formed at another end portion of the outer sleeve that is opposite to the opening, wherein the inner sleeve is inserted into the outer sleeve through the insertion opening;
        a threaded portion, which is used to fix the outer sleeve relative to the camshaft;
        a projection, which radially outwardly projects and is fixed relative to the phase changer, the projection including a first surface which faces axially toward the insertion opening and a second surface which faces axially away from the insertion opening; and
        two types of outer sleeve ports, which are formed at a peripheral surface of the outer sleeve at two locations, respectively, arranged one after another between the threaded portion and the projection in an axial direction of a rotational axis, wherein the two types of outer sleeve ports are configured to communicate between an inside and an outside of the outer sleeve;
    the inner sleeve has:
        two types of inner sleeve ports, which are configured to communicate between an inside and an outside of the inner sleeve and are communicated with the two types of outer sleeve ports, respectively;

an oil port, which is located between the two types of inner sleeve ports in the axial direction of the rotational axis and is configured to communicate between the inside and the outside of the inner sleeve; and an enlarged diameter portion, which is located in the axial direction on one side of the first surface of the projection where the insertion opening is placed, wherein the enlarged diameter portion has an inner diameter that is increased relative to an inner diameter of an adjacent part of the inner sleeve which is adjacent to the enlarged diameter portion;

the spool has:

two land portions, which are located at an outer periphery of the spool at a location that is on another side of the projection where the threaded portion is placed, wherein the two land portions radially outward project and circumferentially extend, and the two land portions are configured to slide along an inner peripheral surface of the inner sleeve, and each of the two land portions is configured to close a corresponding one of the two types of inner sleeve ports depending on a position of the spool;

a spool groove, which is formed between the two land portions and is radially recessed relative to the two land portions, wherein the spool groove is communicated with the oil port, and the spool groove is configured to communicate with one of the two types of inner sleeve ports depending on the position of the spool; and a spool port, which is configured to communicate with another one of the two types of inner sleeve ports and is configured to communicate between an inside and an outside of the spool, wherein the spool port is configured to communicate with the insertion opening through the enlarged diameter portion; and at least one of the outer sleeve and the inner sleeve has an axial groove which is configured to conduct the hydraulic oil in the axial direction of the rotational axis while the axial groove is configured to communicate between the oil port and the opening; and a stopper configured to limit movement of the spool toward the insertion opening, the stopper including a first surface which faces axially toward the projection and a second surface which faces axially away from the projection, and only the first surface of the first and second surfaces of the stopper is installed in contact with a bottom surface of the insertion opening which faces axially away from the projection.

2. The hydraulic oil control valve according to claim 1, wherein a cross-sectional area of an opening, which is formed by overlapping an open hole of one of the two types of outer sleeve ports and an open hole of one of the two types of inner sleeve ports, is larger than a smallest cross-sectional area of an oil flow passage in the hydraulic oil control valve.

3. The hydraulic oil control valve according to claim 2, wherein the open hole of the one of the two types of outer sleeve ports and the open hole of the one of the two types of inner sleeve ports open straight in a radial direction of a central axis of the hydraulic oil control valve and have an identical shape in a view taken from the central axis.

4. The hydraulic oil control valve according to claim 1, wherein a distance between the two types of inner sleeve ports is smaller than an opening diameter of the oil port.

5. The hydraulic oil control valve according to claim 1, wherein the axial groove does not overlap with the enlarged diameter portion in the axial direction of the rotational axis.

6. The hydraulic oil control valve according to claim 1, wherein a clearance is formed between the outer sleeve and the inner sleeve at a location that is on the one side of the projection where the insertion opening is placed.

7. The hydraulic oil control valve according to claim 1, wherein:

the spool has a land-shaped portion that is configured to contact the stopper and radially outwardly projects at the spool; and the land-shaped portion is placed at a location where the land-shaped portion is opposed to the enlarged diameter portion regardless of the position of the spool while the land-shaped portion is spaced from the inner sleeve.

8. The hydraulic oil control valve according to claim 1, wherein:

the stopper is fixed to the inner sleeve; and a sliding surface between the inner sleeve and the spool is located on the another side of the projection where the threaded portion is placed.

9. The hydraulic oil control valve according to claim 1, wherein the inner sleeve is press-fitted into the outer sleeve.

10. The hydraulic oil control valve according to claim 1, wherein the inner sleeve is made of a single material.

11. A valve timing adjusting device comprising the hydraulic oil control valve of claim 1.

12. A hydraulic oil control valve configured to control a hydraulic oil pressure of hydraulic oil to be supplied to a valve timing adjusting device that is placed between a crankshaft and a camshaft of an internal combustion engine and is configured to adjust an opening timing and a closing timing of a valve by changing a phase of a phase changer placed between the crankshaft and the camshaft, the hydraulic oil control valve comprising:

an outer sleeve, which is shaped in a cylindrical tubular form;

an inner sleeve, which is shaped in a cylindrical tubular form and is located on an inner side of the outer sleeve; and a spool, which is shaped in a cylindrical tubular form and is placed on an inner side of the inner sleeve, wherein the spool is configured to be slid along the inner sleeve when the spool is driven by an actuator that is placed at an end portion of the hydraulic oil control valve, which is opposite to the camshaft;

the outer sleeve has:

an opening, which is formed at one end portion of the outer sleeve located on a side where the camshaft is placed, and an insertion opening, which is formed at another end portion of the outer sleeve that is opposite to the opening, wherein the inner sleeve is inserted into the outer sleeve through the insertion opening;

a threaded portion, which is used to fix the outer sleeve relative to the camshaft;

a projection, which radially outwardly projects and is fixed relative to the phase changer; and two types of outer sleeve ports, which are formed at a peripheral surface of the outer sleeve at two locations, respectively, arranged one after another between the threaded portion and the projection in an axial direction of a rotational axis, wherein the two types of outer sleeve ports are configured to communicate between an inside and an outside of the outer sleeve;

the inner sleeve has:

two types of inner sleeve ports, which are configured to communicate between an inside and an outside of the inner sleeve and are communicated with the two types of outer sleeve ports, respectively;

an oil port, which is located between the two types of inner sleeve ports in the axial direction of the rotational axis and is configured to communicate between the inside and the outside of the inner sleeve; and an enlarged diameter portion, which is located on one side of the projection where the insertion opening is placed, wherein the enlarged diameter portion has an inner diameter that is increased relative to an inner diameter of an adjacent part of the inner sleeve which is adjacent to the enlarged diameter portion;

the spool has:

two land portions, which are located at an outer periphery of the spool at a location that is on another side of the projection where the threaded portion is placed, wherein the two land portions radially outward project and circumferentially extend, and the two land portions are configured to slide along an inner peripheral surface of the inner sleeve, and each of the two land portions is configured to close a corresponding one of the two types of inner sleeve ports depending on a position of the spool;

a spool groove, which is formed between the two land portions and is radially recessed relative to the two land portions, wherein the spool groove is communicated with the oil port, and the spool groove is configured to communicate with one of the two types of inner sleeve ports depending on the position of the spool; and a spool port, which is configured to communicate with another one of the two types of inner sleeve ports and is configured to communicate between an inside and an outside of the spool, wherein the spool port is configured to communicate with the insertion opening through the enlarged diameter portion;

at least one of the outer sleeve and the inner sleeve has an axial groove which is configured to conduct the hydraulic oil in the axial direction of the rotational axis while the axial groove is configured to communicate between the oil port and the opening;

the hydraulic oil control valve comprises a stopper that is configured to limit movement of the spool toward the insertion opening;

the spool has a land-shaped portion that is configured to contact the stopper and radially outwardly projects at the spool; and the land-shaped portion is placed at a location where the land-shaped portion is opposed to the enlarged diameter portion regardless of the position of the spool while the land-shaped portion is spaced from the inner sleeve.

13. A hydraulic oil control valve configured to control a hydraulic oil pressure of hydraulic oil to be supplied to a valve timing adjusting device that is placed between a crankshaft and a camshaft of an internal combustion engine and is configured to adjust an opening timing and a closing timing of a valve by changing a phase of a phase changer placed between the crankshaft and the camshaft, the hydraulic oil control valve comprising:

an outer sleeve, which is shaped in a cylindrical tubular form;

an inner sleeve, which is shaped in a cylindrical tubular form and is located on an inner side of the outer sleeve; and a spool, which is shaped in a cylindrical tubular form and is placed on an inner side of the inner sleeve, wherein the spool is configured to be slid along the inner sleeve when the spool is driven by an actuator that is placed at an end portion of the hydraulic oil control valve, which is opposite to the camshaft;

the outer sleeve has:

an opening, which is formed at one end portion of the outer sleeve located on a side where the camshaft is placed, and an insertion opening, which is formed at another end portion of the outer sleeve that is opposite to the opening, wherein the inner sleeve is inserted into the outer sleeve through the insertion opening;

a threaded portion, which is used to fix the outer sleeve relative to the camshaft;

a projection, which radially outwardly projects and is fixed relative to the phase changer, the projection including a first surface which faces axially toward the insertion opening and a second surface which faces axially away from the insertion opening; and two types of outer sleeve ports, which are formed at a peripheral surface of the outer sleeve at two locations, respectively, arranged one after another between the threaded portion and the projection in an axial direction of a rotational axis, wherein the two types of outer sleeve ports are configured to communicate between an inside and an outside of the outer sleeve;

the inner sleeve has:

two types of inner sleeve ports, which are configured to communicate between an inside and an outside of the inner sleeve and are communicated with the two types of outer sleeve ports, respectively;

an oil port, which is located between the two types of inner sleeve ports in the axial direction of the rotational axis and is configured to communicate between the inside and the outside of the inner sleeve; and an enlarged diameter portion, which is located in the axial direction on one side of the first surface of the projection where the insertion opening is placed, wherein the enlarged diameter portion has an inner diameter that is increased relative to an inner diameter of an adjacent part of the inner sleeve which is adjacent to the enlarged diameter portion;

the spool has:

two land portions, which are located at an outer periphery of the spool at a location that is on another side of the projection where the threaded portion is placed, wherein the two land portions radially outward project and circumferentially extend, and the two land portions are configured to slide along an inner peripheral surface of the inner sleeve, and each of the two land portions is configured to close a corresponding one of the two types of inner sleeve ports depending on a position of the spool;

a spool groove, which is formed between the two land portions and is radially recessed relative to the two land portions, wherein the spool groove is communicated with the oil port, and the spool groove is configured to communicate with one of the two types of inner sleeve ports depending on the position of the spool; and a spool port, which is configured to communicate with another one of the two types of inner sleeve ports and is configured to communicate between an inside and an outside of the spool, wherein the spool port is configured to communicate with the insertion opening through the enlarged diameter portion; and at least one of the outer sleeve and the inner sleeve has an axial groove which is configured to conduct the hydraulic oil in the axial direction of the rotational axis while the axial groove is configured to communicate between the oil port and the opening.

* * * * *